United States Patent
Prenzel

(10) Patent No.: US 8,551,570 B2
(45) Date of Patent: Oct. 8, 2013

(54) PRODUCTION OF SEPARATION MATERIALS FOR ADHESIVE TAPES

(75) Inventor: Alexander Prenzel, Hamburg (DE)

(73) Assignee: tesa SE, Hamburg (DE)

( * ) Notice: Subject to any disclaimer, the term of this patent is extended or adjusted under 35 U.S.C. 154(b) by 101 days.

(21) Appl. No.: 13/201,901

(22) PCT Filed: Feb. 19, 2010

(86) PCT No.: PCT/EP2010/052107
§ 371 (c)(1),
(2), (4) Date: Sep. 12, 2011

(87) PCT Pub. No.: WO2010/100041
PCT Pub. Date: Sep. 10, 2010

(65) Prior Publication Data
US 2011/0319556 A1   Dec. 29, 2011

(30) Foreign Application Priority Data

Mar. 4, 2009 (DE) .......................... 10 2009 011 166

(51) Int. Cl.
*B32B 9/04* (2006.01)
(52) U.S. Cl.
USPC .......................................... 427/387; 428/447
(58) Field of Classification Search
USPC .......................................... 428/447; 427/387
See application file for complete search history.

(56) References Cited

U.S. PATENT DOCUMENTS

| | | | |
|---|---|---|---|
| 4,576,999 A | 3/1986 | Eckberg | |
| 4,678,846 A | 7/1987 | Weitemeyer et al. | |
| 4,725,630 A | 2/1988 | Magee et al. | |
| 4,978,726 A | 12/1990 | Dohler et al. | |
| 6,844,409 B2 * | 1/2005 | Angeletakis et al. | 526/279 |
| 7,659,003 B2 | 2/2010 | Aoki et al. | |
| 2006/0094834 A1 | 5/2006 | Aoki et al. | |
| 2008/0138386 A1 * | 6/2008 | Joffre et al. | 424/445 |
| 2009/0114342 A1 | 5/2009 | Aoki et al. | |
| 2009/0171056 A1 | 7/2009 | Hofmann et al. | |

FOREIGN PATENT DOCUMENTS

| | | |
|---|---|---|
| DE | 3316166 C1 | 11/1983 |
| DE | 3820294 C1 | 10/1989 |
| DE | 60001779 T2 | 2/2004 |
| DE | 10200601017594 A1 | 10/2007 |
| DE | 602005002111 T2 | 5/2008 |
| EP | 0168713 | 1/1986 |
| EP | 1070734 A2 | 1/2001 |

OTHER PUBLICATIONS

English-Language International Search Report dated Apr. 29, 2010.
German-Language Search Report dated Nov. 9, 2009.
Mechanism and Activity of Ruthenium Olefin Metathesis Calaysts; Melanie S. Sanford, et al.,; J. Am/ Chem. Soc. 2001, 123, 6543-6554; Mar. 8, 2001.
N-Heterocyclic Carbenes in Synthesis; Edited by Steven P. Nolan; Wiley-VCH Verlag GmbH & Co. KGaA, p. 1-25; 2006.
Cross-Linking of Hexenyl Silicone Plymers Via the Olefin Metathesis Reaction; Journal of Inorganic and Organometallic Polymers, Judith Stein, et al.,; pp. 367-376; XP002578175; Bd. 4, Nr. 4, 1994.

* cited by examiner

*Primary Examiner* — Margaret Moore
(74) *Attorney, Agent, or Firm* — Norris McLaughlin & Marcus, P.A.

(57) ABSTRACT

A process produces a separative layer of a release liner, based on a formulation comprising at least one alkenyl-substituted organopolysiloxane, wherein the formulation is present in solution. During the process a metathesis catalyst is added to the solution and the solution with the metathesis catalyst is applied onto a carrier material, wherein, on the carrier material, a metathesis reaction of the alkenyl-substituted organopolysiloxane takes place for crosslinking of the formulation.

9 Claims, No Drawings

PRODUCTION OF SEPARATION MATERIALS FOR ADHESIVE TAPES

This is a 371 of PCT/EP2010/052107 filed 19 Feb. 2010 (international filing date), and claims the priority of German Application No. 10 2009 011 166.2 filed 4 Mar. 2009.

The invention relates to a process for producing homogeneous, silicone-based release materials for pressure-sensitive adhesive tapes, with temporally stable peel forces by means of hydrosilane and/or hydrosiloxane-free, thermal cross-metathesis, and also to the use of hydrosilane and/or hydropolysiloxane-free release materials.

Adhesive tapes coated on one or both sides with adhesives are generally, at the end of the production operation, wound up into a roll in the form of an Archimedean spiral. In order to prevent the pressure-sensitive adhesives, in the case of double-sided adhesive tapes, coming into contact with one another, or in order to prevent the sticking of the pressure-sensitive adhesive to the carrier in the case of single-sided adhesive tapes, the adhesive tapes are applied, prior to winding, to a liner material (also referred to as release material), which is wound up together with the adhesive tape. The skilled person knows such liner materials under the name of release liners or just liners. In addition to the lining of single- or double-sided adhesive tapes, liners are also used for enveloping labels.

A liner (release paper, release film) is not part of an adhesive tape or label, but instead just an auxiliary means in its production, storage or further-processing by diecutting. Furthermore, in contrast to an adhesive-tape carrier, a liner is not firmly joined to a layer of adhesive.

Adhesive coating materials are widely used for the production of liners in the coating especially of sheet materials such as papers or films, in order to reduce the adhesion tendency of adherent products with respect to these surfaces (separative function).

Where a double-sided adhesive tape equipped with a liner is unwound, it is normally applied by the exposed—that is, liner-free—pressure-sensitive adhesive side to a substrate. The other pressure-sensitive adhesive side at this time still adheres sufficiently to the coated surface of the liner to allow the adhesive tape to be handled.

However, the liner must be able to be peeled from the adhesive tape. The liner itself, or the peeling of the liner, must not have any substantial adverse effect on the bond strength of the pressure-sensitive adhesive for subsequent use.

At the same time, the stability of the antiadhesive coating (also referred to as release coating) on the liner, in other words the adhesiveness, over long time periods is important in order to ensure the function of this coating and also to ensure the properties of the pressure-sensitive adhesive enveloped with the liner.

Crosslinkable silicone systems are frequently used as a release coating. Such systems include mixtures of crosslinking catalysts and so-called thermally curable condensation-crosslinking or addition-crosslinking polysiloxanes. For condensation-crosslinking silicone systems, tin compounds, such as dibutyltin diacetate, are frequently present in the composition as crosslinking catalysts.

Silicone-based release coatings on an addition-crosslinking basis can be cured by hydrosilylation. These release systems typically comprise the following constituents: an alkenylated polydiorganosiloxane (in particular, linear polymers with terminal alkenyl groups), a polyorganohydrosiloxane crosslinking agent, and a hydrosilylation catalyst. Catalysts which have become established for addition-crosslinking silicone systems (hydrosilylation catalyst) include, for example, platinum or compounds of platinum, such as the Karstedt catalyst, for example [a Pt(0) complex compound].

In addition it is also possible to use photoactive catalysts, known as photoinitiators, in combination with UV-curable, cationically crosslinking siloxanes on an epoxide and/or vinyl ether basis, and/or UV-curable, free-radically crosslinking siloxanes such as, for instance, acrylate-modified siloxanes. The use of electron beam-curable silicone acrylates is a further possibility. Depending on their intended use, such systems may also comprise further additions such as stabilizers or flow control assistants.

Furthermore, there are various kinds of organopolysiloxane compositions known that crosslink by heating or irradiation. They include compositions, as described in DE 600 01 779 T2, for example, which crosslink by addition reaction, namely by temperature treatment of a mixture comprising an organopolysiloxane having hydrogen atoms attached directly to the silicon atoms, and an organopolysiloxane having vinyl groups attached directly to the silicon atoms, in the presence of a hydrosilylation catalyst.

Photopolymerizable organopolysiloxane compositions can be used as well. Examples include compositions which are crosslinked by the reaction between organopolysiloxanes which have hydrocarbon radicals that are substituted by acrylate and/or methacrylate groups and are attached directly to the silicon atoms, and in the presence of a photosensitizer (see EP 0 168 713 B1 or DE 38 20 294 C1). Likewise possible for use are compositions in which the crosslinking reaction between organopolysiloxanes which have mercapto-group-substituted hydrocarbon attached directly to the silicon atoms, and organopolysiloxanes having vinyl groups attached directly to the silicon atoms, is induced in the presence of a photosensitizer. Compositions of this kind are described in U.S. Pat. No. 4,725,630 A1, for example.

When using the organopolysiloxane compositions described, for example, in DE 33 16 166 C1, which have hydrocarbon radicals substituted by epoxy groups and attached directly to the silicon atoms, the crosslinking reaction is induced by the release of a catalytic amount of acid obtained by photodecomposition of added onium salt catalysts. Other organopolysiloxane compositions which can be cured by a cationic mechanism are materials which have, for example, propenyloxysiloxane end groups.

Of the silicones stated, the addition-crosslinking (hydrosilylation-curing) silicones have the greatest economic importance. One unwanted property of these systems, however, is their sensitivity toward catalyst poisons, such as heavy metal compounds, sulfur compounds, and nitrogen compounds, for example. It is generally the case that electron donors can be considered to be platinum poisons. The presence of catalyst poisons means that the crosslinking reaction between the different constituents of a silicone release varnish no longer takes place or takes place only to a small extent.

In the production of antiadhesive silicone coatings, therefore, the presence of catalyst poisons, more particularly of platinum poisons, is strictly avoided. Moreover, hydrosilanes and organopolysiloxanes are reactive, in some cases very reactive, with hydrogen atoms attached directly to silicon atoms, and in particular are sensitive to moisture, possibly giving rise to problems with the pot life of the formulation of the as yet uncured silicone compositions, and/or with the storage of the chemicals.

The practical application of the stated antiadhesive silicone coatings, however, exhibits a series of disadvantages.

For instance, the level of the peel force of a pressure-sensitive adhesive from a silicone release liner is typically adjusted by means of silicone MQ resins (typically siliconemethylsilicone rubber resins). Depending on the requirement concerning the product, a different level is required for the peel forces. This makes it necessary to use and hence also to stock a number of release liners with different levels of MQ resin content.

Furthermore, release liners can frequently not be used immediately after production, since the properties of the liner have not yet attained a constant level. This is evident in particular from measurements of the release forces. These forces fall, generally, in the first few days and weeks after production, before reaching a constant level. The effect is termed "post-curing" or post-crosslinking. The time between production of the release liner and coating with pressure-sensitive adhesive is called, correspondingly, the post-curing time, post-crosslinking time or else aging time. Depending on the requirement with regard to the release liner and the pressure-sensitive adhesive used on the release liner, the aging time may amount to several weeks. On account of the required aging time, the release liners produced have to be stored, entailing storage costs.

A further problem arises from the fact that, in laminates of release liners and pressure-sensitive adhesives, there is sometimes an increase observed in the peel forces in the course of storage. The skilled person knows of this effect as "adhesive lock-up" or, specifically for acrylate-based pressure-sensitive adhesives, as "acrylic lock-up". In certain circumstances, this effect means that the release liner is difficult if not impossible to peel from the pressure-sensitive adhesive and hence that the product becomes unusable, and may be explained in some cases by a chemical reaction of hydrosilyl groups with the polyacrylate or else with the double bond in natural and synthetic rubber.

It is an object of the invention to avoid or at least reduce the disadvantages of the prior art. It is desirable in particular

- to reduce the fraction of highly reactive compounds such as, for example, hydrosilanes or organopolysiloxanes having hydrogen atoms attached to silicon atoms, or to avoid the use of such compounds entirely, in order to ensure sufficient pot lives in the production of the silicone coating,
- to be able to set different peel forces between an acrylate-based pressure-sensitive adhesive which is present on a liner furnished with a silicone coating and said liner itself, without affecting the bond strength of the pressure-sensitive adhesive,
- to shorten the required aging time before use of the release liner, and/or
- to prevent acrylic lock-up.

The object is achieved by means of a silicone coating having separative properties ("release layer"), i.e., the capacity to reduce the adhesion tendency of adherent products (pressure-sensitive adhesives) toward the untreated surfaces, said coating being obtainable by metathesis crosslinking of a formulation comprising at least one alkenyl-substituted organopolysiloxane.

A particular feature of the process is that there is no need to use hydrosilanes and/or hydrosiloxanes as crosslinker substances. Advantageously, therefore, the process is carried out in the absence of these compounds.

It can be shown that the release layers obtained with the process of the invention exhibit a significantly reduced tendency to adhesive lock-up and more particularly to acrylic lock-up, as compared with such release layers having comparable silicone compositions that have been crosslinked by means of hydrosilanes and/or hydrosiloxanes.

The main claim relates, accordingly, to a process for producing a separative layer of a release liner (of a liner material; also as release paper, release film), based on a formulation comprising at least one alkenyl-substituted organopolysiloxane, wherein the formulation is present in solution, a metathesis catalyst is added to the solution, the solution provided with the catalyst is coated onto a carrier material, and on the carrier material a metathesis reaction of the alkenyl-substituted organopolysiloxane takes place for the crosslinking of the formulation.

The crosslinking takes place in particular between two alkenyl substituents each of the organopolysiloxane molecules, through a cross-metathesis reaction:

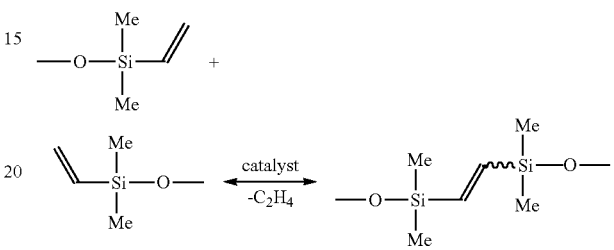

Accordingly, there is a crosslinking reaction between the alkenyl substituents of the organopolysiloxane component of the formulation. In one version of the invention, the formulation is confined to this component.

In the context specifically of the reaction mechanism, from which it is apparent that the driving force in the linking of the two alkenyl substituents is the formation and escape of gaseous ethene, it is surprising, and not obvious to the skilled person, that the process based on this reaction is suitable for producing silicone coatings, since it could have been assumed that the formation of gas would lead to bubbling and hence to an inhomogeneous coating.

The designation "alkenyl" used above relates to a linear, branched or cyclic hydrocarbon group having 2 to 20 carbon atoms that contains at least one double bond, such as, for example, ethenyl, n-propenyl, isopropenyl, n-butenyl, isobutenyl, octenyl, decenyl, tetradecenyl, hexadecenyl, eicosenyl, tetracosenyl. Preferred alkenyls have 2 to 12 carbon atoms. The designation "substituted alkenyl" denotes an alkenyl which is provided with one or more substituents. Unless described further, the alkenyl designation embraces, linear, branched, cyclic, unsubstituted and/or substituted alkenyls.

In one very advantageous embodiment of the invention, the metathesis reaction takes place during the drying of the applied formulation, in other words during the removal of the solvent from the applied layer of the formulation. The thermal energy needed for the metathesis is then advantageously supplied during the drying of the formulation, in particular by means of the heat which is also used for the drying itself.

In one preferred procedure, the formulation further comprises at least one silicone MQ resin. The silicone MQ resin is composed of $R_3SiO_{1/2}$ units ("M units") and $SiO_{4/2}$ units ("Q units"), the substituents R in the M units being, independently of one another, alkyl groups, alkenyl groups, and/or alkylsilyl groups, more particularly methyl groups.

The silicone MQ resin may remain unaffected by the metathesis reaction. With suitable substituents R of the silicone MQ resin, however, this resin may also participate in the metathesis reaction and hence be incorporated into the network as well. Correspondingly, in the presence of two or more silicone MQ resins, no resin, one resin or all of the resins may react in the metathesis reaction with the alkenyl-substituted organopolysiloxane and/or with one another.

Suitable catalysts for the crosslinking reaction include, for example, metal carbene complexes, more particularly those based on molybdenum, titanium, tungsten, rhenium, osmium or, in particular, ruthenium, used either as the metal carbene or formed in situ by the addition of co-catalysts such as, for example, trimethylaluminum, tetramethyltin or other metal organyls. It is also possible, furthermore, to use combinations of two or more catalysts.

Particular preference is given to the selection of olefin metathesis catalysts, which are active for a large number of cross-metatheses between alkenyl compounds, preferably terminal alkenyl compounds, and more preferably for mono-substituted, terminal alkenyl compounds (in this regard, cf.: Grubbs, Sandford, Love, *J. Am. Chem. Soc.* 2001, 123, 6543; S. Beligny, S. Blechert, *N-Heterocyclic Carbene-Ruthenium Complexes in Olefin Metathesis Reactions*, in "*N-Heterocyclic Carbenes in Synthesis*" (Ed. S. P. Nolan), Wiley-VCH, Weinheim 2006, 1-25). Examples of olefin metathesis catalysts advantageous for the purposes of this invention, though without wishing to impose any restriction, include the following metal carbene complexes: Grubbs $1^{st}$-generation catalyst (bis(tricyclohexylphosphine)dichlororuthenium(II)benzylidene, [($PCy_3$)$_2Cl_2$]Ru=CHPh), Grubbs $2^{nd}$-generation catalyst ([1,3-bis(2,4,6-trimethylphenyl)-2-imidazolidinylidene]dichloro(tricyclohexylphosphine)ruthenium(II) benzylidene), Hoveyda-Grubbs $1^{st}$-generation catalyst (dichloro(o-isopropoxyphenylmethylene)-(tricyclohexylphosphine)ruthenium(II)), Hoveyda-Grubbs $2^{nd}$-generation catalyst (1,3-bis(2,4,6-trimethylphenyl)-2-imidazolidinylidene)dichloro(o-isopropoxyphenylmethylene)-ruthenium(II)), [1,3-bis(2,4,6-trimethylphenyl)-2-imidazolidinylidene]dichloro(3-methyl-2-butenylidene)(tricyclohexylphosphine)ruthenium(II), [1,3-bis(2,4,6-trimethylphenyl)-2-imidazolidinylidene]dichloro-bis(3-bromopyridine)ruthenium(II) benzylidene, 1,3-bis(2,4,6-trimethylphenyl)-2-imidazolidinylidene)dichloro[3-(2-pyridinyl)propylidene]ruthenium(II), [1,3-bis(2-methylphenyl)-2-imidazolidinylidene]dichloro-(2-isopropoxyphenylmethylene)ruthenium(II), [1,3-bis(2-methylphenyl)-2-imidazolidinylidene]dichloro(phenylmethylene)(tricyclohexylphosphine)ruthenium(II), dichloro(3-methyl-2-butenylidene)bis(tricyclohexylphosphine)ruthenium(II), dichloro(3-methyl-2-butenylidene)bis(tricyclopentylphosphine)ruthenium(II), and 2,6-diisopropylphenylimidoneophylidene[rac-BIPHEN]molybdenum(VI).

The release liner is equipped in accordance with the invention with a silicone coating. The silicone coating provided on the liner is preferably silicone which is equivalent to an addition-crosslinking silicone formulation, without the reactive crosslinkers (H—Si compounds).

Particularly advantageous silicones are elucidated in more detail below.

The silicone-based release coatings used in accordance with the invention are coatings which can be cured by cross-metathesis, more particularly thermally. In accordance with the invention, these release systems encompass the following constituents: an alkenylated polydiorganosiloxane (more particularly, linear polymers having terminal alkenyl groups) and also an olefin metathesis catalyst, more particularly of the type identified above.

Thermally curing release coatings that are advantageous in accordance with the invention, based on cross-metathesis-crosslinking silicones, are multicomponent systems composed typically of the following components:

a) a linear or branched polydimethylsiloxane which is composed of approximately 80 to 200 dimethylsiloxane units and is terminated at the chain ends with vinyldimethylsiloxy units, or a linear polydimethylsiloxane which is composed of approximately 80 to 200 dimethylsiloxane units and approximately 1 to 10 methylvinylsiloxane units and is terminated at the chain ends with vinyldimethylsiloxy units. Typical representatives are, for example, solvent-free silicone oils which are normally used as addition-crosslinking systems, such as DEHESIVE® 920, 912 or 610, all commercially available from Wacker-Chemie GmbH, such as SYL-OFF® SL 9104, commercially available from Dow Corning GmbH, or such as POLYMER VS 100, 1000, 10 000, 100 000, commercially available from Hanse Chemie AG.

b) a silicone MQ resin which as M unit, in addition to the trimethylsiloxy units commonly used, also possesses vinyldimethylsiloxy units. Typical representatives of this group are, for example, the release force regulator CRA® 17 or CRA® 42, commercially available from Wacker-Chemie GmbH, or SYL-OFF® SL 9154, commercially available from Dow Corning GmbH.

c) an olefin metathesis catalyst such as, for example, a second-generation Grubbs or Hoveyda-Grubbs catalyst, which is commercially available from Sigma-Aldrich.

Additionally suitable and in the sense of the invention are compositions as described for example in aforementioned DE 600 01 779 T2, particularly in claim 12 and also in paragraphs [0036] to [0050] therein. These release systems are systems which crosslink by addition reaction, namely by temperature treatment of a mixture of an organopolysiloxane having hydrogen atoms attached directly to the silicon atoms, and an organopolysiloxane having vinyl groups attached directly to the silicon atoms, in the presence of a hydrosilylation catalyst. Through the combination of a hydrosilylation catalyst with the olefin metathesis catalyst of the invention it is possible, given appropriate gradation of the reactivities of the catalysts, to obtain a dual-cure system (double crosslinking system), which means that, first of all, at a low temperature, a crosslinking reaction is initiated, and subsequently at a higher temperature, a second crosslinking step (desired post-curing) can be added.

Examples of pressure-sensitive adhesives, but without wishing to undertake any restriction, which are advantageous for the purposes of this invention include the following adhesives, which can be coated from solution, from aqueous dispersion, from the melt or as a reactive system: acrylate PSA, synthetic rubber, and styrene block copolymer compositions, with an elastomer block of unsaturated or hydrogenated polydiene blocks (polybutadiene, polyisoprene, copolymers of both, and also further elastomer blocks familiar to the skilled person), and also further pressure-sensitive adhesives familiar to the skilled person, can be used for the silicone-containing release coatings. Where acrylate-based pressure-sensitive adhesives are referred to in the context of this specification, the term also embraces, without explicit mention, pressure-sensitive adhesives that are based on methacrylates and based on acrylates and methacrylates, unless expressly described otherwise. Likewise in the sense of the invention are combinations and blends of two or more base polymers, and also adhesives additized with tackifier resins, fillers, aging inhibitors, and crosslinkers, the listing of the additives being meant only by way of example and not restrictively.

The invention further provides for the use of corresponding release layers in the form of a release liner, used in direct contact to the pressure-sensitive adhesive. Through the use of the separative layers of the invention, or separative layers produced in accordance with the invention, it is possible to regulate the peel forces with which the liner is peeled from the pressure-sensitive adhesive.

The expression "regulation of the peel forces" here encompasses the setting of the peel forces to a particular level, the reduction of the aging time, in other words the time between production of the release liner and contacting with the layer of pressure-sensitive adhesive (in other words, the timing of the peel forces to a level suitable for the application), and also the prevention of reactions between the pressure-sensitive adhesive and the silicone (in other words, the prevention of the relevant aging of the system and hence the temporal modification of the peel forces). Consequently, the identified use includes all processes which produce at least one, more preferably all, of the stated effects.

As metal carbenes for the metathesis reaction it is preferred to use olefin metathesis catalysts which, with regard to the cross-metathesis of alkenyls, especially terminal alkenyls, and more preferably monosubstituted alkenyls, exhibit a heightened reactivity. Particularly preferred is the use of olefin metathesis catalysts based on ruthenium (Grubbs and Hoveyda-Grubbs catalysts) and on molybdenum (Schrock catalysts), since these catalysts have a high turnover number (reactivity and number of catalyst cycles) and also, in the case of the Grubbs and Hoveyda-Grubbs systems, have an increased tolerance toward traces of water and oxygen and also heteroatoms in the polymer. The catalysts for crosslinking the silicone-based release layer are used in an amount of up to 10% by weight, more preferably from 0.01% to 5% by weight, very preferably 0.01% to 2% by weight.

By the amount of catalyst added it is possible to set the peel forces of the adhesive layer from the release liner directly via the degree of crosslinking. Surprisingly it has been found that the aging time and also the temporal stability of the peel forces are in turn independent of the catalyst concentration, and that peel forces that are virtually constant over time are achieved immediately after coating and crosslinking of the silicone composition, with no adhesive lock-up occurring.

For setting peel forces in the low to medium range, it is advantageous to increase the amount of catalyst in the silicone composition, to a range, for instance, of 0.1% to 5% by weight, more particularly from 0.1% to 2% by weight.

The silicones are—especially in solution—applied to the carrier, for which all coating methods familiar to the skilled person can be used, and then, where necessary, dried (have their solvent removed) thereon, and subsequently form a coherent silicone coating.

As carrier material of the liner it is possible in particular to use papers or films. Films used in this case are preferably polyolefin films (polypropylene films and polyethylene films) or polyester films.

The invention lastly provides for the use of the silicone-based release coating of the invention in an adhesive tape.

The invention is elucidated in more detail below with reference to examples, without these examples being intended to have any restrictive effect whatsoever.

EXAMPLES

Production of Release Liners

Comparative Example

A crosslinkable silicone composition consisting of 70 parts of Dow Corning SYL-OFF® SL 9104, 30 parts of Dow Corning SYL-OFF® SL 9154, 8.9 parts of Dow Corning SYL-OFF® SL 7689, and 1.6 parts of Dow Corning SYL-OFF® 4000 was applied from 30% strength solution in benzine, using a #1 doctor blade, to a PET film (Lumirror 60.01, 75 µm, Toray). The silicone was crosslinked at 150° C. for 30 seconds. The silicone coat weight was set to 1.3 g/m$^2$.

Example RL1

A crosslinkable silicone composition consisting of 70 parts of Dow Corning SYL-OFF® SL 9104, 30 parts of Dow Corning SYL-OFF® SL 9154, and 1.6 parts of Hoveyda-Grubbs $2^{nd}$-generation catalyst ((1,3-bis(2,4,6-trimethylphenyl)-2-imidazolidinylidene)dichloro(o-isopropoxyphenylmethylene)ruthenium(II), CAS No.: 301224-40-8) from Sigma-Aldrich was applied from 30% strength solution in toluene, using a #1 doctor blade, to a PET film (Lumirror 60.01, 75 µm, Toray). The silicone was crosslinked at 150° C. for 30 seconds. The silicone coat weight was set to 1.3 g/m$^2$.

Example RL2

A crosslinkable silicone composition consisting of 70 parts of Dow Corning SYL-OFF® SL 9104, 30 parts of Dow Corning SYL-OFF® SL 9154, and 0.6 part of Hoveyda-Grubbs $2^{nd}$-generation catalyst ((1,3-bis(2,4,6-trimethylphenyl)-2-imidazolidinylidene)dichloro(o-isopropoxyphenylmethylene)ruthenium(II), CAS No.: 301224-40-8) from Sigma-Aldrich was applied from 30% strength solution in toluene, using a #1 doctor blade, to a PET film (Lumirror 60.01, 75 µm, Toray). The silicone was crosslinked at 150° C. for 30 seconds. The silicone coat weight was set to 1.3 g/m$^2$.

Example RL3

A crosslinkable silicone composition consisting of 70 parts of Dow Corning SYL-OFF® SL 9104, 30 parts of Dow Corning SYL-OFF® SL 9154, and 0.1 part of Hoveyda-Grubbs $2^{nd}$-generation catalyst ((1,3-bis(2,4,6-trimethylphenyl)-2-imidazolidinylidene)dichloro(o-isopropoxyphenylmethylene)ruthenium(II), CAS No.: 301224-40-8) from Sigma-Aldrich was applied from 30% strength solution in toluene, using a #1 doctor blade, to a PET film (Lumirror 60.01, 75 µm, Toray). The silicone was crosslinked at 150° C. for 30 seconds. The silicone coat weight was set to 1.3 g/m$^2$.

Preparation of the Acrylate Pressure-Sensitive Adhesive

In a radical polymerization in a conventional 200 L reactor, 0.7 kg of acrylic acid, 33.95 kg of 2-ethylhexylacrylate, 33.95 kg of butyl acrylate, 1.4 kg of glycidyl methacrylate, and 23.35 kg of special-boiling-point spirit 60/95, and also 23.35 kg of acetone, were introduced as an initial charge. After nitrogen gas had been passed through the reaction solution for 45 minutes, with stirring, the reactor was heated to 58° C. and 0.07 kg of Vazo 67™ (from DuPont) in solution in 0.35 kg of acetone was added. The external heating bath was then heated to 75° C. and the reaction was carried out constantly at this external temperature. After a reaction time of 1 hour, 0.07 kg of Vazo 67™ (from DuPont) in solution in 0.35 kg of acetone was added. After a reaction time of 2.5 hours, 0.091 kg of dicyclohexyl peroxydicarbonate (Perkadox 16®, from Akzo Nobel) was added. After a reaction time of 3.5 hours, 10.50 kg of special-boiling-point spirit 60/95 were added as a diluent. Further dilution took place after 7.5 hours, by addition of 10.5 kg of special-boiling-point spirit 60/95. After a reaction time of 24 hours, the polymerization was discontinued and the reaction vessel was cooled to room temperature.

The polymer was subsequently blended with 37.5% by weight of Sylvares TP 95 (terpene-phenolic resin having a softening temperature of 95° C.) and 0.3% by weight of ZnCl$_2$ (% by weight based in each case on the polymer).

Preparation 1 of Test Strips Example RL1-3 and Comparative Example by Means of Knifecoating (Examples B1-4)

The pressure-sensitive adhesive was applied immediately, unless described otherwise, to the respective release liner with the aid of a coating bar. The pressure-sensitive adhesive, following evaporation of the major part of the solvent, was dried in a forced-air oven at 120° C. for 15 minutes. A coat weight of 50 g/m$^2$ was selected. After the samples had cooled, a PET film 23 μm thick [Polibond D23H, Polifibra Folien GmbH] was laminated onto the pressure-sensitive adhesive. The respective assemblies made up of release liner, pressure-sensitive adhesive, and 23 μm PET film were cut into strips 2 cm wide.

Preparation 2 of Test Strips Example RL1-3 and Comparative Example by Means of Lamination (Examples B5-8)

The pressure-sensitive adhesive was applied to a PET film 23 μm thick [Polibond D23H, Polifibra Folien GmbH] with the aid of a coating bar. The pressure-sensitive adhesive, following evaporation of the major part of the solvent, was dried in a forced-air oven at 120° C. for 15 minutes. A coat weight of 50 g/m$^2$ was selected. Following acclimatization of the samples at 23±1° C. and 50±5% relative humidity, the respective release liner was laminated onto the pressure-sensitive adhesive. The respective assemblies made up of release liner, pressure-sensitive adhesive, and 23 μm PET film were cut as quickly as possible into strips 2 cm wide.

Description of the Measurement of Samples B1-B4

The peel force of the PET film and pressure-sensitive adhesive from the release liner was measured at an angle of 180° with a peel speed of 0.3 m/min, the measurement being carried out at 23±1° C. under a relative humidity of 50±5%. The peel force was measured approximately 24 hours after the coating of the release paper with the pressure-sensitive adhesive.

Description of the Measurement of Samples B5-B8

The cut strips were stored under a pressure of 2 N/cm$^2$ for one minute. The peel force of the PET film and pressure-sensitive adhesive from the release liner was measured at an angle of 180° with a peel speed of 0.3 m/min, the measurement being carried out at 23±1° C. under a relative humidity of 50±5%. The time between lamination of the liner and measurement of the peel force was always less than five minutes.

In addition, a measurement of the peel force was carried out again after the assemblies made up of release liner, pressure-sensitive adhesive and PET film have been stored at 70° C. for 30 days.

From table 1 below it is apparent that the addition of the olefin metathesis catalyst reduces the peel force of the PET film and pressure-sensitive adhesive from the release liner. The higher the concentration of the catalyst, the greater the effect. The peel forces of the comparative example are the highest. At a very low catalyst concentration and hence a low degree of crosslinking, the peel force is already very closely approximate to the value of comparative example B1.

From the series from comparative example 1 to 5 it is evident how the peel force of the release liner from the pressure-sensitive adhesive goes down as the aging time increases.

TABLE 1

| Experiment | Peel force [cN/cm] |
| --- | --- |
| Comparative example B1 | 68 |
| Example B2 | 26 |
| Example B3 | 40 |
| Example B4 | 67 |

From table 2 below it is apparent that the peel force of the pressure-sensitive adhesive on the addition-crosslinked release liner increases significantly in the course of storage. The silicone compositions crosslinked by means of metathesis exhibit, in turn, virtually no post-curing effect, and the peel forces remain virtually constant.

TABLE 2

| Experiment | Peel force, immediate [cN/cm] | Peel force after storage at 70° C. for 30 days [cN/cm] |
| --- | --- | --- |
| Comparative example B5 | 7 | 89 |
| Example B6 | 3 | 4 |
| Example B7 | 5 | 7 |
| Example B8 | 7 | 10 |

The investigated crosslinking and the process for producing a silicone-based, hydrosilane- and/or hydropolysiloxane-free release coating by means of cross-metathesis was suitable for fulfilling the object of the invention outstandingly, without showing any substantial effect on the suitability of the pressure-sensitive adhesives for their particular intended use. Having emerged as of particularly outstanding suitability are olefin metathesis catalysts, especially the Grubbs and Hoveyda-Grubbs catalyst systems. The release coatings produced by means of this process and the new crosslinking method showed virtually no aging or post-curing and also no acrylic lock-up, thereby making the use of such release coatings a distinct advantage as compared with the prior art.

The invention claimed is:

1. A process for producing a separative layer of a release liner, based on a formulation comprising at least one alkenyl-substituted organopolysiloxane, wherein the formulation is present in solution, the process comprising:
    adding a metathesis catalyst to the solution;
    coating the solution provided with the metathesis catalyst onto a carrier material, wherein, on the carrier material, a metathesis reaction of the alkenyl-substituted organopolysiloxane takes place for crosslinking the formulation,
    wherein the formulation further comprises a silicone MQ resin, composed of R$_3$Si$_{1/2}$ units, as M units, and SiO$_{4/2}$ units, as Q units, wherein the substituents R in the M units are methyl groups.

2. The process according to claim 1, further comprising:
    supplying thermal energy necessary for the metathesis reaction to the formulation in the course of drying.

3. The process according to claim 1, wherein the process is carried out in the absence of hydrosilanes and hydrosiloxanes.

4. The process according to claim 1, wherein the metathesis catalyst is a metal carbene complex.

5. The process according to claim 4, wherein the metathesis catalyst is a ruthenium-based catalyst.

6. The process according to claim 1, wherein the metathesis catalyst is present in an amount of 0.01 to 10 percent by weight, based on the total weight of the formulation.

7. The process according to claim 6, wherein the metathesis catalyst is present in an amount of 0.1 to 5 percent by weight, based on the total weight of the formulation.

8. A separative layer of a release liner, wherein the separative layer of the release liner is obtained by the process according to claim 1.

9. The process according to claim 7, wherein the metathesis catalyst is present in an amount of 0.1 to 2 percent by weight, based on total weight of the formulation.

* * * * *